June 19, 1951  O. G. BLOCHER  2,557,861
COMBINATION BRACKET AND VENT FOR FLEXIBLE TANKS
Filed Sept. 17, 1945
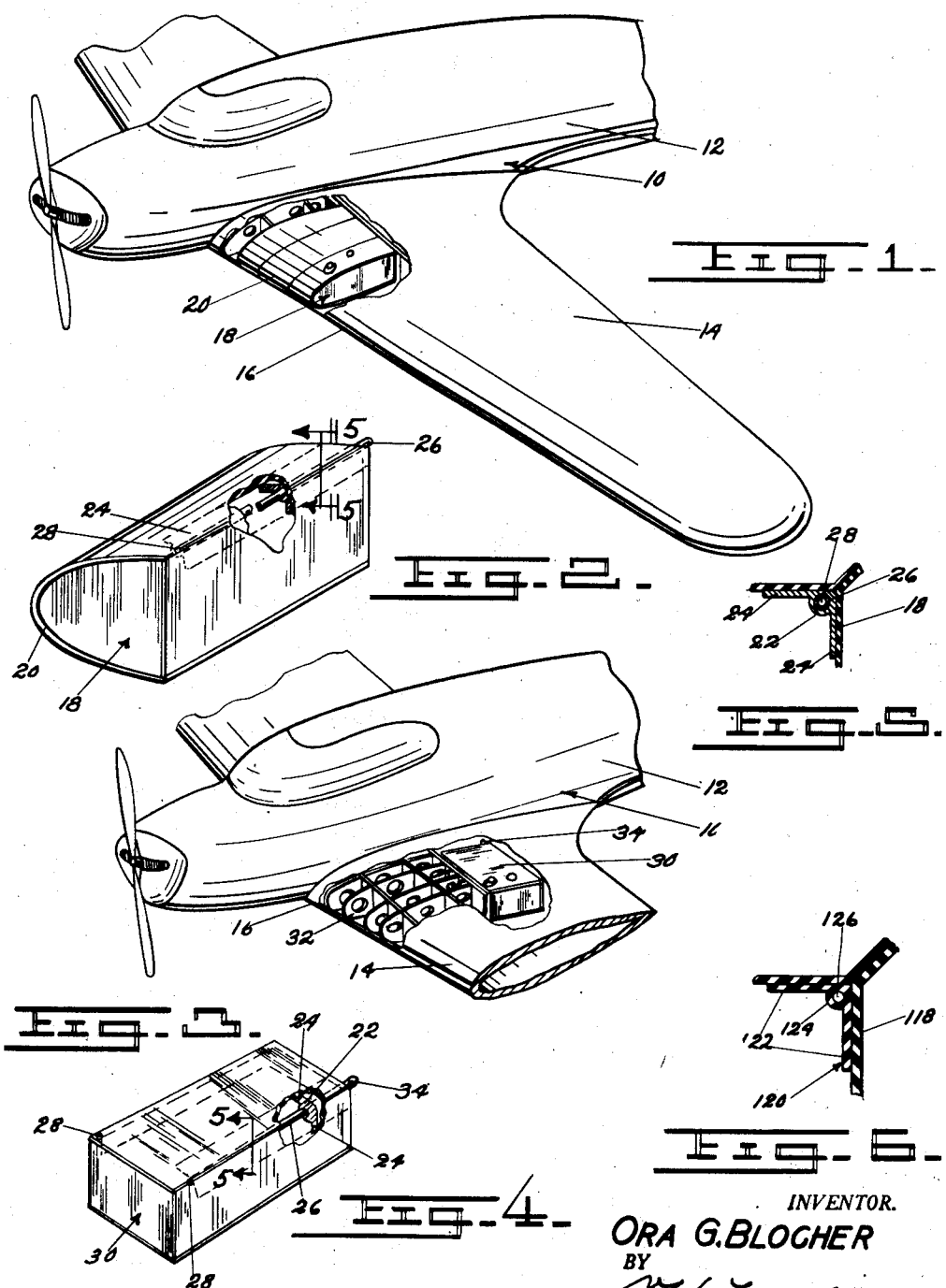
INVENTOR.
ORA G. BLOCHER
BY
ATTORNEY Patented June 19, 1951

2,557,861

UNITED STATES PATENT OFFICE 2,557,861

COMBINATION BRACKET AND VENT FOR FLEXIBLE TANKS

Ora G. Blocher, Dearborn, Mich., assignor to Bendix Aviation Corporation, Detroit, Mich., a corporation of Delaware Application September 17, 1945, Serial No. 616,889

3 Claims. (Cl. 150—0.5)

This invention relates to fuel tanks and more particularly to a combination reinforcing member and vent for aircraft fuel cells.

An object of the invention is to provide a reinforcing member for the edges of a flexible fuel tank, said member comprising a tube having a passage therein communicating with the inside of the tank.

Another object of the invention is to provide a venting member for a fuel tank, comprising a tube providing for communication between the tank and the atmosphere, said member also serving as an edge reinforcement for the conventional non-rigid fuel tank.

A further object of the invention is to obviate the necessity of providing conventional external piping for venting purposes in an aircraft wing-installed fuel tank.

Other objects and advantages of the invention will be apparent from the following description taken in conjunction with the drawing forming part of this specification, and in which:

Fig. 1 is a view partly broken away of an aircraft showing a fuel tank embodying the invention;

Fig. 2 is a view in perspective partly broken away of a fuel tank embodying the invention;

Fig. 3 is a partially broken away view of an aircraft showing a modification of the fuel tank embodying the invention;

Fig. 4 is a view in perspective partially broken away of the fuel tank of Fig. 3;

Fig. 5 is a sectional view along the lines 5—5 in Figs. 2 and 4 illustrating the tubular reinforcing vent member; and Fig. 6 is a sectional view illustrating a modification of the reinforcing vent member.

Referring to the drawing for more specific details of the invention 10 is a conventional type aircraft having a fuselage 12 and wings 14 with rounded leading edges 16. A rubber-type fuel tank indicated generally at 18 has a rounded front portion 20 contoured to the configuration of the leading edge 16 of the wing 14.

A bracket 22 having mutually perpendicular arms 24 is sleeved on a rigid tube 26 and the bracket is vulcanized or otherwise bonded to the rubber tank within the upper inside edge of said tank. The bracket 22 and the tube 26 contained therein do not extend the width of the tank, but are foreshortened to provide for communication between the tank and the atmosphere by way of passage 28 in the tube. Atmospheric communication with the tube 26 is provided by a venting conduit, not shown, which is situated in any desirable manner in the fuselage so as to connect with a passage therethrough.

A modified form of the fuel tank is designated 30 in Figs. 3 and 4. The tank is rectangular in plan, and is located within the wings 14 rearwardly of wing supporting members 32. This allows for the provision of brackets 22 and tubes 26 on substantially three sides of the tank and the consequent venting through two of the passages 28 in the tubes 26. The two passages become confluent at the fuselage end of the tank to provide a single vent line 34 leading in a manner not shown into the fuselage and from thence into the atmosphere.

The passages 28 in the tubes 26 open into the tank at the high or wing tip end of the tank, said wing tip end being the high end due to the dihedral angle of the conventional aircraft wing.

It is of course to be understood that the invention may be modified to obtain the same end results with a change in structure. Such a modification is shown in Fig. 6 wherein a rubber fuel tank, indicated at 118, has vulcanized thereto a rubber reinforcement member 120 said member having mutually perpendicular arms 122, a rounded portion 124 in the right angle formed by the juncture of the arms, and a circular passage 126 therethrough adapted to serve as the venting means.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a flexible tank having opposed side walls and a top, a reinforcing right angle bracket secured to the inside of the tank at the juncture of one of the side walls and the top thereof so as to maintain a right angle between said side wall and the top, and a tube carried within the bracket, one end of said tube passing through said side wall and the other end of said tube terminating within the tank at a point spaced from the opposite side wall so as to provide communication between the inside of the tank and the atmosphere.

2. In a container, having at least one flexible side wall and a flexible top providing an internal corner at the juncture thereof, a reinforcing bracket fitted in the corner and having a longitudinal opening therethrough, said bracket extended substantially the length of the tank, and a conduit connected into the longitudinal opening and extended beyond the tank so as to provide communication between the inside of the tank and the atmosphere.

3. In a container having a flexible side wall and a flexible top providing a substantially right angle internal corner at the juncture thereof, a bracket fitted in the corner and having a longitudinal opening therethrough, said bracket extended substantially the length of the tank, said opening being in constant communication with the inside of the tank, and a conduit in the opening extended beyond the tank so as to vent the inside of the tank to the atmosphere.

ORA G. BLOCHER.

REFERENCES CITED

The following references are of record in the file of this patent:

UNITED STATES PATENTS

| Number | Name | Date |
| --- | --- | --- |
| 2,102,590 | Gray et al. | Dec. 21, 1937 |
| 2,355,084 | Kurrle | Aug. 8, 1944 |
| 2,404,418 | Walker | July 23, 1946 |